Patented Dec. 15, 1936

2,064,786

UNITED STATES PATENT OFFICE 2,064,786

DRYING OIL COMPOSITION

Harry M. Dent, Buffalo, N. Y., assignor to General Plastics, Inc., North Tonawanda, N. Y.

No Drawing. Original application February 29, 1932, Serial No. 595,970. Divided and this application April 15, 1935, Serial No. 16,511

12 Claims. (Cl. 260—2)

The present invention relates to a process for the production of paints, varnishes, lacquers and the like, and has particular reference to the production of such materials by incorporating substituted derivatives of phenol in drying oil. This application is a division of Serial No. 595,970.

An object of the invention is the production of an artificial resin like mass suitable for use in combination or in conjunction with drying oils as a protective coating, molding composition, enamel, binder for linoleum, in cold molding processes and the like. These and other objects of the invention will be described in the following specification and pointed out with particularity in the appended claims.

It is well known that certain natural vegetable oils possess the inherent property of increasing in viscosity and molecular weight when subjected to a bodying process, as for instance a boiling treatment. This phenomenon is well illustrated in oils, such as China-wood oil, perilla oil and linseed oil among others; China-wood oil being converted to a heavy gel when heated for an extended period of time at an elevated temperature. Natural resin may be incorporated with oils of this type to produce varnish. Artificial resin, as, for instance, synthetic phenolic derivatives which may be considered as produced by condensation, however, have not been directly compatible with drying oils. In order to make these synthetic resins "oil reactive" or compatible with the oil, it has been found necessary to flux the artificial resin with natural resin, or with certain synthetic resins such as ester gum or, by treating the artificial resin with certain chemical compounds as, for instance, beta-naphthol.

I have discovered that fused masses containing quantities of certain substituted phenolic compounds may be admixed directly with drying oils, such as those mentioned above, producing a varnish material, coating composition, or molding composition as the case may be. Films of the admixed oil and artificial mass possess marked resistance to chemical action, and, in addition, are very desirable for use in certain processes since they possess a high degree of adhesion. In addition, films produced directly from admixtures of drying oil and the artificial resin-like masses about to be disclosed, possess marked advantages since the mass is apparently directly soluble in the oil with the production of a homogeneous film rather than the production of a film wherein certain of the products have not been directly soluble in drying oil but have been fluxed therewith by foreign materials producing films in which there is an inert "filler" of resinous type.

Certain phenol substituted products, such as those aromatic compounds containing several benzene nuclei as, for instance, the triphenyl methane or aurine group, when combined with a drying oil, produce a very desirable varnish product, molding compound, and the like. Thus, I have discovered that P, P', P'' trihydroxy triphenyl methane forms a desirable addition product with oil when it is made compatible therewith to produce a varnish material, solution being effected by proper heating treatment. Other triphenyl methane derivatives may be used as additive materials for drying oils, as, for instance, rosolic acid derivatives.

The individual substituted phenol derivatives may be produced from simple materials such as phenol by what may be regarded as a condensation reaction. Thus, phenol and oxalic acid may be heated in the proportion of three moles of phenol to one mole of oxalic acid in the presence of a condensing agent such as sulfuric acid, and the resultant condensation product isolated; where phenol and cresol are mixed in proper proportions and substituted in the above reactive mixtures, rosolic acid is the condensation product formed on properly controlling the chemical reaction. These end products when isolated, namely, trihydroxy triphenyl methane and rosolic acid may be admixed in desirable quantities to produce the particular color in the final product which is sought, and the admixture fused to produce an artificial resin-like mass. This mass, or the individual substituted phenol, if added to a drying oil in the proportion desired, and heated therewith, produces a completely homogeneous mass suitable for use as a varnish. These artificial resin-like masses or the individual products react directly with oil and are compatible with oil to produce one phase systems therewith when heated together with the oil at temperatures in the neighborhood of 150° C. This temperature may be higher or may be somewhat lower depending upon the particular qualities desired in the end product and depending upon the quantity and type of the artificial resin-like mass which it is desired to combine with the oil.

Beatty's methane, for instance, has been found to be a desirable oil reactive product, when fused either individually or with substantial proportions of the triphenyl methane derivatives mentioned herein, or with certain other diphenyl methane derivatives about to be described. Beatty's methane, as is known, may be produced from acetone and phenol in the presence of a suitable condensing agent. Thus, 175 parts of acetone in the presence of 840 parts of phenol and 84 parts of concentrated hydrochloric acid as a condensing agent will, when allowed to stand overnight, produce a resin-like material or artificial mass which has been called the Beatty's methane, that is, a technical grade of dihydroxy diphenyl dimethyl methane. This material when heated with a drying oil combines therewith to produce a one phase system; the resulting product being suitable for use as a varnish, a binding agent, molding composition, and the like.

A diphenyl methane derivative which I have found to be particularly efficacious in the preparation of varnishes by direct solution in oil such as China-wood oil, is P, P' dihydroxy diphenyl methane. I have found the hydroxy phenyl derivatives of ethane, propane, butane and other homologs may also be admixed directly with oil, or in mixtures added thereto, as they form homogeneous systems with oil such as China-wood oil and other drying oils. In general, it may be said that the desirable hydrocarbons which are compatible with the oil to form a soluble reaction product therewith and, therefore, a one phase system, contain the phenyl group linked or combined with one carbon atom or at one position in the hydrocarbon, or linked or combined with different carbon atoms. A compound of the former type is represented by alpha dihydroxy diphenyl ethane and of the latter, alphabeta trihydroxy triphenyl ethane, this latter compound being formed by the reaction between parahydroxy benzyl alcohol with dihydroxy diphenyl methane in the presence of a condensing agent such as an acid, as for instance, one percent hydrochloric acid. Like the products mentioned above, alpha dihydroxy diphenyl ethane and alphabeta trihydroxy triphenyl ethane both individually and when mixed with one another or with the triphenyl methane derivatives or diphenyl methane derivatives mentioned above, produce artificial resin-like masses which are oil reactive and form one phase systems therewith suitable for the preparation of varnish, molding compositions and the like.

Further, I have found that groups in addition to the hydroxy group may be present in the benzene ring in these various phenyl substituted hydrocarbons such as the triphenyl or diphenyl methane, ethane or other hydrocarbon homologs. Thus, the benzene nuclei may be substituted with groups other than hydroxyl such as nitro, chloro, alkyl, aryl or mixed side chains such as those found in wood phenols.

It is to be noted that the resin-like materials or substituted phenol derivatives suitable for combining with drying oil possess an especially good solubility in many solvents ordinarily used in the varnish or lacquer industries, as, for instance, benzol and its homologs, solvent naphtha, ethyl, butyl and amyl acetates, butyl alcohol, denatured alcohol, diacetone alcohol, and in addition combine with and are soluble in certain of the oils, such as China-wood oil, linseed oil, menhaden oil, perilla oil, soya bean oil, at temperatures in the neighborhood of 150° C. The very fact that these resin-like materials are freely compatible with drying oils at a moderate temperature indicates that the resin-like material possesses a high superiority over other synthetic resins, and further, the resin-like reaction material when added to China-wood oil at an elevated temperature, as, for instance, in the neighborhood of 450 to 550° F., produces a varnish product which forms an exceptionally resistant film which will withstand the action of a great many chemicals; this is especially true when the film is baked on metal, the film resisting weak acids as well as solutions of aqueous alkali up to 10% strength. Alcohol, formaldehyde, and other organic chemicals have very little effect upon the film so produced.

As examples of the mode of producing oil compatability, the following practical examples are given:

*Example I—20 gallon varnish*

| | | |
|---|---|---|
| Mixed or individual phenolic condensation products, so called "artificial resin-like mass" | lbs | 100 |
| China-wood oil | gals | 20 |
| "Varnoline" | gals | 35 |
| Toluene | gals | 3½ |
| Cobalt linoleate | gals | 1½ |

Method: Body at 480° F. about 1¼ hours to a bead, add dryer, cool and reduce.

*Example II—Long oil baking varnish*

| | | |
|---|---|---|
| Mixed or individual condensation product, so called "artificial resin-like mass" | lbs | 100 |
| China-wood oil | gals | 50 |
| Cobalt linoleate | ozs | 8 |
| "Varnoline" | gals | 75 |

Method: The oil is heated to 450° F., the resin added and bodied at 460° for 30 to 40 minutes, cooled and reduced in the usual manner.

This when baked gives a light colored film and it is recommended that it be baked for one hour at 250° F. No wrinkling is produced in baking at this time. The varnish gives the following tests. Specific gravity 896, viscosity 110 centiposes, solids 62.4%, kauri reduction satisfactory at 170%.

*Example III—Air drying varnish*

| | | |
|---|---|---|
| Mixed or individual phenolic condensation product, so called "artificial resin-like mass" | lbs | 100 |
| China-wood oil | gals | 40 |
| Cobalt linoleate | lbs | 3 |
| "Varnoline" | gals | 55 |

Method: Resin and oil are heated to 460° F., held for 30 minutes, dryer added, cooled and reduced.

In Example I the artificial resin-like mass consists of an individual or mixture of individual phenolic condensation products of the type disclosed herein, which when fused produce a glassy appearing mass, varying in color from WW to M or darker upon the rosin standard. For instance, the mass may consist of several individual chemical substances, be somewhat darker in color, show a melting point of about 80° C., and possess an acid number of about 10 to 15; another type of resin-like material is a light yellowish pink in color with a melting point in the neighborhood of 90° C.; while the purer chemical products such as p p dihydroxy diphenyl methane are substantially colorless and melt at about 110° C. These may be considered a technical grade i. e., substantially one chemical compound of any of the types mentioned above with slight amounts of other similar oil reactive products as incidental admixtures, being more than 90% of one chemical individual such as dihydroxy diphenyl ethane.

While I have produced varnishes and other products as noted above, by combining certain chemical compounds directly with drying oil, these compounds may be used in conjunction with ester gums or with Congo and the like.

What is claimed is:

1. The process of making a varnish from a drying oil and substantially pure p-dihydroxy diphenyl ethane which comprises heating a reaction mixture consisting essentially of the oil and the ethane derivative together in the neighborhood of 450 to 550° F., until a homogeneous liquid mass is produced as a reaction product which does not separate upon cooling.

2. The process of making a varnish from a drying oil which comprises heating the drying oil and a predetermined amount of a fused artificial resin-like mass formed from p-dihydroxy diphenyl methane and p-dihydroxy diphenyl ethane in the neighborhood of 450 to 550° F., until a homogeneous liquid mass is produced which does not separate upon cooling.

3. The process of making a varnish from a drying oil which comprises heating a reaction mixture consisting essentially of the drying oil and a predetermined amount of a fused artificial resin-like mass formed by fusion of p-dihydroxy diaryl alkyl hydrocarbons together until a homogeneous liquid mass is produced as a reaction product which does not separate upon cooling.

4. The process of making a varnish from a drying oil which comprises heating the drying oil in the neighborhood of 450 to 550° F. with a predetermined amount of a fused artificial resin-like mass formed from p-dihydroxy diphenyl methane and p-dihydroxy diphenyl ethane, the p-dihydroxy diphenyl methane being present in larger quantity than the p-dihydroxy diphenyl ethane until a homogeneous liquid mass is produced which does not separate on cooling.

5. The process of making a varnish from a drying oil and a p-dihydroxy diaryl alkyl hydrocarbon which comprises heating a reaction mixture consisting essentially of the oil and the hydrocarbon to a temperature in the neighborhood of about 450 to 550° F., and until a homogeneous liquid mass is produced as a reaction product which does not separate upon cooling.

6. A composition of matter consisting of the reaction product of a drying oil and a polyhydroxy-phenyl alkyl hydrocarbon.

7. A composition of matter consisting of the reaction product of China-wood oil and a polyhydroxy-phenyl alkyl hydrocarbon.

8. A composition of matter consisting of the reaction product of a drying oil and dihydroxy diphenyl ethane.

9. A composition of matter consisting of the reaction product of a drying oil and dihydroxy diphenyl methane.

10. A composition of matter consisting of the reaction product of a drying oil and a substituted hydrocarbon of the group consisting of methane, ethane, propane and butane, the hydrocarbon being substituted by at least two hydroxy aryl groups.

11. The step in the formation of a varnish product from a reaction mixture consisting essentially of a drying oil and an artificial resin-like mass of hydroxy aryl alkyl hydrocarbon having two or more hydroxy aryl groups attached to the hydrocarbon which comprises heating the mass and oil together at a temperature above the softening point of the resin-like mass and until a homogeneous product is formed.

12. The method of producing union of a drying oil and a hydroxy aryl alkyl hydrocarbon having two or more parahydroxy aryl groups attached to the hydrocarbon in a reaction mixture consisting essentially of such ingredients which consists in heating the oil and the hydrocarbon to a temperature at which merging occurs.

HARRY M. DENT.